United States Patent
Oro García et al.

(10) Patent No.: US 9,235,769 B2
(45) Date of Patent: Jan. 12, 2016

(54) PARALLEL OBJECT DETECTION METHOD FOR HETEROGENEOUS MULTITHREADED MICROARCHITECTURES

(75) Inventors: David Oro García, Barcelona (ES); Carles Fernández Tena, Barcelona (ES); Javier Rodríguez Saeta, Barcelona (ES)

(73) Assignee: HERTA SECURITY, S.L., Barcelona (ES)

( * ) Notice: Subject to any disclaimer, the term of this patent is extended or adjusted under 35 U.S.C. 154(b) by 496 days.

(21) Appl. No.: 13/421,298

(22) Filed: Mar. 15, 2012

(65) Prior Publication Data

US 2013/0243329 A1  Sep. 19, 2013

(51) Int. Cl.
*G06K 9/46* (2006.01)
*G06K 9/62* (2006.01)
*G06K 9/00* (2006.01)

(52) U.S. Cl.
CPC .......... *G06K 9/00973* (2013.01); *G06K 9/4642* (2013.01); *G06K 9/4671* (2013.01); *G06K 9/6257* (2013.01)

(58) Field of Classification Search
CPC  G10L 15/34; G06T 2210/52; G06K 9/00973; G06K 9/4642; G06K 9/6257
USPC .......................................... 382/103, 190, 195
See application file for complete search history.

(56) References Cited

U.S. PATENT DOCUMENTS

| | | | |
|---|---|---|---|
| 7,129,962 B1 * | 10/2006 | Cote et al. ...................... | 345/643 |
| 7,522,171 B1 * | 4/2009 | Nordquist ...................... | 345/581 |
| 2005/0220336 A1 * | 10/2005 | Sabe et al. ..................... | 382/159 |
| 2007/0294512 A1 * | 12/2007 | Crutchfield et al. ........... | 712/200 |
| 2009/0034864 A1 * | 2/2009 | Kisilev et al. .................. | 382/260 |

* cited by examiner

*Primary Examiner* — Edward Park
*Assistant Examiner* — Michael Vanchy, Jr.
(74) *Attorney, Agent, or Firm* — Merchant & Gould P.C.

(57) ABSTRACT

A parallel object detection method for heterogeneous microarchitectures. The method is designed for increasing the throughput of object detection in a computer system that is equipped with an array of cores including a shared memory, a constant memory, and functional units. Latency reduction is achieved through a multilevel parallelization method that exploits fine-grain data-level parallelism using multithreaded SIMD computations, and coarse-grain parallelism by relying on concurrent kernel execution.

11 Claims, 11 Drawing Sheets

PARALLEL OBJECT DETECTION METHOD FOR HETEROGENEOUS MULTITHREADED MICROARCHITECTURES

FIELD OF THE INVENTION

The present invention pertains to the field of parallel processing. In particular, relates to parallel object detection methods in images for heterogeneous multithreaded microarchitectures such as those that combine graphics processing units with central processing units.

BACKGROUND OF THE INVENTION

Modern computer systems usually include, without limitation, a central processing unit (CPU), a graphics processing unit (GPU) and several input or output devices. Typically, the CPU is designed for executing general purpose software whereas the GPU is specifically optimized for performing 3D rendering computations such as texture mapping or geometric transformations. State of the art CPU microarchitectures include one or more processing cores with the purpose of exploiting both coarse-grain and fine-grain thread-level parallelism (TLP). Coarse-grain parallelism is achieved by concurrently executing several computing tasks or processes in the available general purpose CPU cores. This load balancing distribution is implemented in the operating system (OS) scheduler by assigning to each process an execution time slot for each core. On the other hand, fine-grain TLP is implemented in the hardware of each core and tries to minimize the underutilization of the functional units by simultaneously fetching and executing instructions from different threads. This technique is known as simultaneous multithreading and is extensively used in current CPU designs for maximizing the performance of parallel applications and OS processes.

Examples of workloads that potentially benefit from parallelism are computer vision algorithms, particularly object detection methods. These techniques determine the location of specific objects such as traffic signs, handwritten characters or even human faces within an image or video frame. One of the most widely used methods for performing object detection relies on a boosted cascade of classifiers. This cascade arranges a set of weak classifiers sequentially with the purpose of building an aggregated strong classifier. This approach facilitates the rejection of negative candidates at early stages of the cascade, thus quickly discarding image regions that are not likely to contain the desired objects. Even though the hierarchical nature of the boosted cascade prevents any attempt of inter-stage parallelization, it is still possible to evaluate different image regions in parallel just by assigning them to different CPU threads.

Since these threads need to perform a huge amount of arithmetic operations, the overall object detection latency could be dramatically reduced if the amount of arithmetic and logic units (ALUs) within each CPU core were increased. Unfortunately, the flat memory access model and complex out-of-order execution engines offered by CPUs tends to spend large portions of the chip die in big caches, buffers and speculation logic, thus reducing the available area for additional functional units. Unlike general-purpose CPUs, stream processor microarchitectures such as GPUs try to exploit data-level parallelism (DLP) and adopt a radically different memory hierarchy with small-sized on-die shared memories in which data locality is managed by the programmer. The footprint in terms of spent die area for this approach is much lesser and therefore more transistors are devoted to increase the number of available ALUs. In order to maximize the utilization of these ALUs, modern GPUs implement DLP through Single Instruction Multiple Data (SIMD) instructions that are executed in an array of lightweight multithreaded cores. These cores are organized in clusters in such a manner that data locality and synchronization within the cluster is achieved by using a shared memory.

Heterogeneous microarchitectures combine the characteristics of both CPUs and GPUs, usually in the same chip die. These designs offer a massively parallel multithreaded execution engine that is tightly coupled with one or more general purpose out-of-order processing cores. With the emergence of such technology, there is a need for a parallel object detection method that fully exploits the computing capabilities of the underlying hardware. The efficient usage of both coarse-grain and fine-grain parallelism within all the steps involved during the objection detection process would maximize the occupancy of the available SIMD processing units, thus decreasing the latency of image analysis. This increased detection throughput enables the real-time processing of high resolution images and video frames that feature a large amount of objects (e.g. human faces) in scenarios such as highly crowded environments.

SUMMARY OF THE INVENTION

Embodiments of the present invention provide a computer-implemented method for efficiently performing detections of variable sized objects in images under heterogeneous multithreaded architectures. The throughput of such systems is heavily dependent on the proper balance of thread computations among the plurality of cores and SIMD processing units available. Therefore, there exists a need for an object detection method that fully exploits the underlying architecture of those massively parallel computer systems, in order to accelerate this time-consuming process.

One embodiment of the present invention sets for a method for performing object detection by exploiting multiple levels of parallelism. The method includes the steps of generating a plurality of downscaled images from the input image, and executing a plurality of data-parallel kernel operations to determine whether an image region contain an object or not.

According to one aspect of the present invention, the said kernel operations involve the computation of summed area tables through its decomposition into a plurality of data-parallel prefix sum, parallel transposition operations, and parallel evaluation of a cascade of classifiers.

According to another aspect of the present invention, all the abovementioned kernel operations are concurrently scheduled and executed in the computer system. Therefore, fine-grain parallelism is exploited within a kernel by performing computations using a plurality of threads, which themselves rely on a plurality of SIMD instructions for exploiting data-level parallelism in the functional units. Moreover, coarse-grain parallelism is exploited by concurrently executing the said kernel operations in the plurality of cores.

According to another aspect of the present invention, the summed area table is split into a plurality of table chunks, and then stored in the shared memory of each core in order to improve the data locality, and thus increase the memory bandwidth during the cascade evaluation process. Similarly, the cascade classifiers are stored in the constant memory available in each core before starting the required computations.

One advantage of the disclosed method is that achieves the full occupancy of both the cores and the functional units of the abovementioned computer system, while reducing the latency of memory operations through an efficient usage of the underlying cache hierarchy. Thus, the overall speed and throughput of the object detection process is dramatically improved relative to prior art techniques.

DETAILED DESCRIPTION OF THE INVENTION

Embodiments of the present invention provide a parallel object detection method for efficiently exploiting the hardware resources of heterogeneous multithreaded microarchitectures such as those that combine CPUs with GPUs. Therefore, the problem to be solved involves the decomposition of the elemental operations performed during the object detection process into several parallel computations using threads in such a way that maximizes the overall throughput.

System Overview

Figure 1:
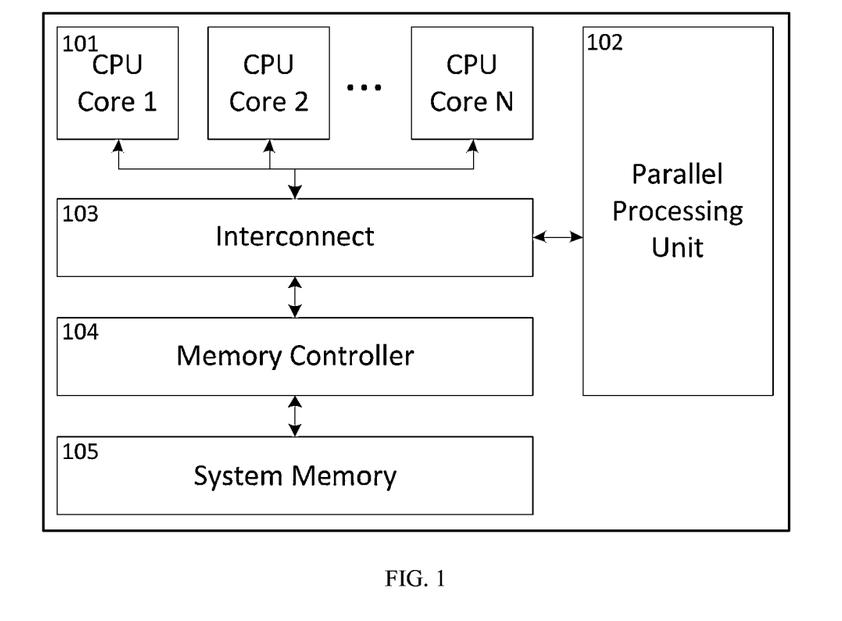
FIG. 1 illustrates the block diagram of a computer system that represents a heterogeneous microarchitecture according to an embodiment of the present invention.

An embodiment of a heterogeneous multithreaded microarchitecture is shown as a computer system block diagram in FIG. 1. The computer system includes N central processing units or CPU cores 101 and a bus path communicating to the external system memory 105 via a memory controller 104 and a multiprocessor interconnect network 103. The memory controller 104 may implement a DRAM interface (e.g. DDR4) which is shared with the parallel processing unit (PPU) 102. Each one of the available CPU cores 101 is designed for executing general purpose code and may implement a combination of any of the existing techniques for exploiting both instruction and thread level parallelism (e.g., out of order execution and simultaneous multithreading). The PPU 102 is a massively parallel engine that is specifically conceived for performing computations of workloads that benefit from data level parallelism (DLP). These workloads may range from graphics computations such as geometric transformations (usually performed in shaders) to fluid dynamic simulations or computational finance. The PPU 102 could be implemented in hardware as a programmable accelerator that features stream computing capabilities or a graphics processing unit (GPU).

The architectural block diagram shown in FIG. 1 is illustrative and may be modified as desired. For instance, in some embodiments, the CPU cores 101 and the PPU 102 could use decoupled memories instead of accessing a unified system memory. In this case, the PPU 102 includes its own memory controller 104 and is thus directly connected to its corresponding system memory 105. Referring again to FIG. 1, the depicted block diagram is meant to be implemented in the same chip. Therefore, it could be integrated in a package on package (PoP) system on chip (SoC) across multiple layers or even in a single chip die. However, in particular embodiments, variations may exist. For example, a given heterogeneous microarchitecture implemented on a chip could not include the system memory 105 and access one or more off-die memory DRAM chips.

Figure 2:
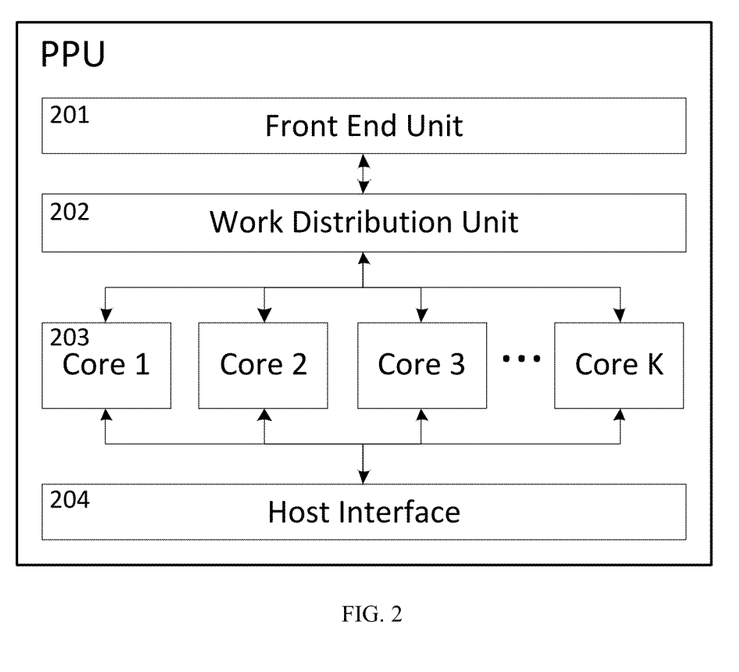
FIG. 2 is a block diagram of the parallel processing unit depicted in the computer system of FIG. 1.

As is shown in detail FIG. 2, the PPU 102 is itself composed of an array of K processing cores 203. Each one of these cores differ from the CPU cores 101 in the sense that PPU cores are designed to execute a large number of threads 903 in parallel, which cooperatively perform computations on a particular set of input data. The PPU 102 also features a host interface 204 that exchanges memory request packets originated from its cores 203 with the system memory 105 through the network interconnect 103. The data parallel computations to be executed in the PPU 102 are issued from the CPU cores 101 in the form of processing tasks and directed to a front end unit 201 that may be derived from a conventional design. The inner workings of the front end unit 201 are omitted as not being critical for the present invention. All thread instructions that constitute processing tasks are scheduled to the PPU cores 203 via the work distribution unit 202. This unit is somehow similar to the issue queue of a conventional CPU, and thus must distribute thread instructions as the computational resources of the PPU cores 203 become available.

Figure 3:
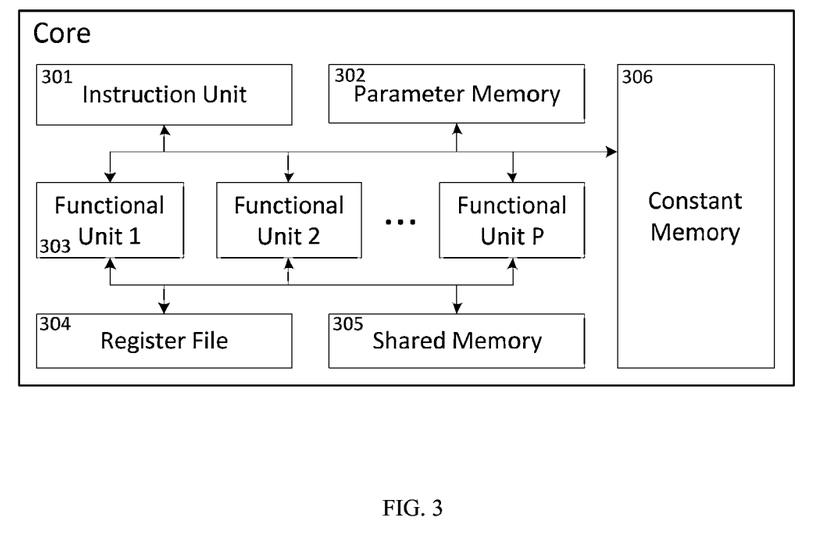
FIG. 3 shows a block diagram with further details of the parallel processing unit according to an embodiment of the present invention.

FIG. 3 illustrates a block diagram of a PPU core 203. Each PPU core 203 implements a computation engine by combining P functional units 303 which are specifically designed for executing data parallel SIMD instructions. Since these cores 203 are multithreaded (i.e. being capable of concurrently executing M threads 903), a PPU core 203 in this embodiment executes M*P threads 903 concurrently on each clock cycle. The data to be processed by each PPU core 203 is usually accessed from the shared memory 305 even though it could be accessed from the system memory 105. Therefore, whenever the shared memory 305 is accessed at the expense of the system memory 105, the executed code will achieve a higher throughput derived from the reduced latency and increased bandwidth of the underlying memory subsystem. Each PPU core 203 fetches thread instructions from its instruction unit 301, the contents of which are managed by the work distribution unit 202.

Similarly, thread instruction operands and computed results are loaded and stored in a register file 304. Even though the thread arrangement is heavily dependent on the programming model used (e.g. OpenCL or CUDA), there are common parameters such as the thread identification numbers and the amount of thread groups used. These values are used by the execution engine logic of each PPU core 203 and stored in the parameter memory 302 for steering fetched thread instructions into functional units 303. This fact is required for ensuring the correctness of the committed instructions. In addition, each PPU core 203 also features a constant memory 306 which is managed by the programming model. The constant memory 306 is designed for broadcasting stored values among threads 903 that simultaneously execute memory read instructions pointing to the same addresses. For this reason this kind memory is read only, and its contents written by the programming model before executing any instructions. Additionally, in one embodiment, the contents of the constant memory 306 of each PPU cores 303 may be the same.

Programming Model

Embodiments of the present invention hierarchically decompose the parallel object detection method by using one or more of the programming model specifications that are available for GPUs, FPGAs or multicore CPUs. Frameworks such as OpenCL or CUDA offer a standardized abstraction API for exploiting parallelism from the underlying microarchitecture. These APIs also implement runtime libraries which transparently manage the scheduling and execution of kernel functions among the different cores and functional units available in a computer system. Under these programming environments the parallel code must be structured into one or more kernel functions. The code of the main application is then divided into some serial work handled by the CPU cores 101 and multithreaded data-parallel kernel functions which are executed in the parallel processing unit (PPU) 102.

Figure 11:
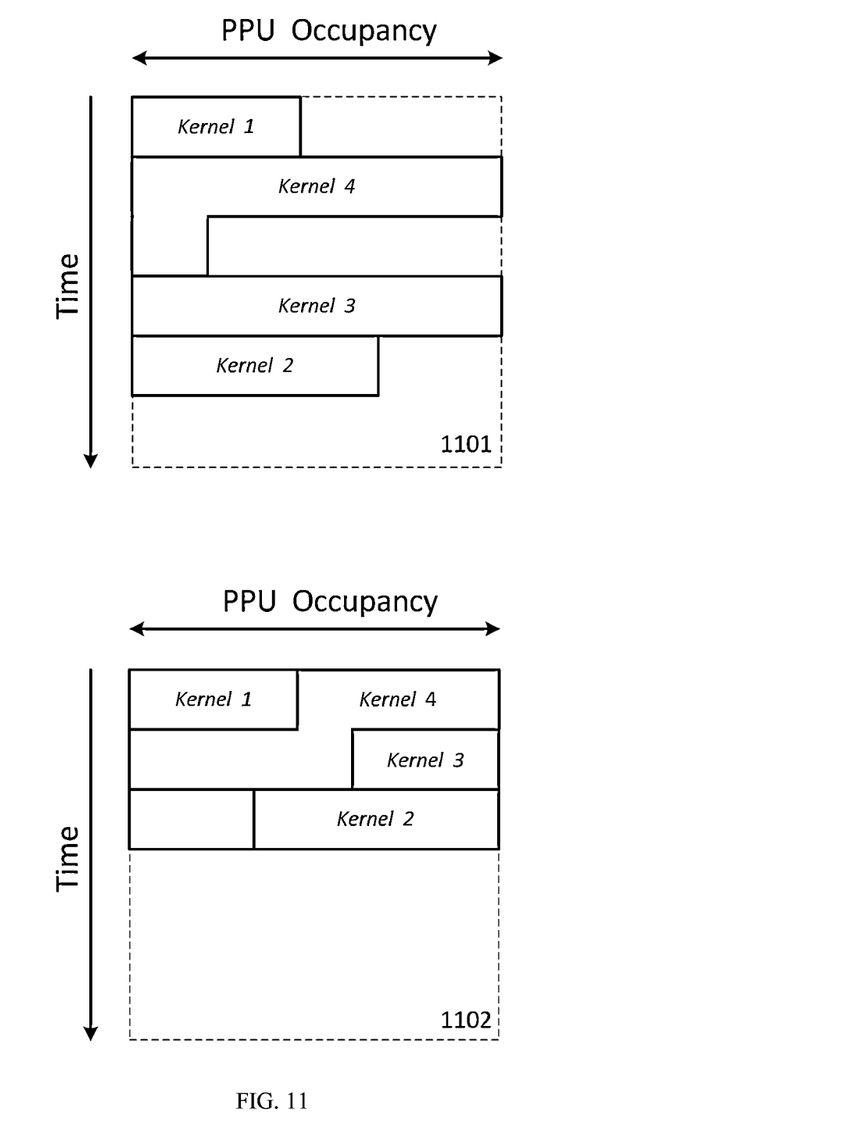
FIG. 11 illustrates the differences between serial and concurrent kernel execution in the cores of the parallel processing unit, in accordance with one or more aspects of the present invention.

The PPU 102 of the computer system described in FIG. 2, simultaneously fetches and executes instructions from multiple kernel functions which may process data from different streams. This fact enables the concurrent execution of different kernel functions thus maximizing the occupancy of the PPU cores 203 and the application throughput. The comparison of both serial and concurrent kernel execution are depicted in FIG. 11. When kernels are serially executed 1101, PPU resources are underutilized. Therefore, idle PPU cores 203 could be executing instructions from other kernels instead of ineffectively consuming computing cycles. In order to address this issue, the PPU 102 can issue and execute instructions from different kernels concurrently 1102. As FIG. 11 shows, concurrent execution 1102 may reduce the execution time in situations where computations are unbalanced. These kernel functions are coded using language constructs that explicitly express data-level parallelism by using a set of threads 903 or work-item groups. Additionally, each thread 903 shares the same memory address of the main program thus benefiting from a global view of memory. Inter-thread memory consistency and data locality are manually managed by the programmer by loading and storing data in the shared memory of each PPU core 203.

Figure 9:
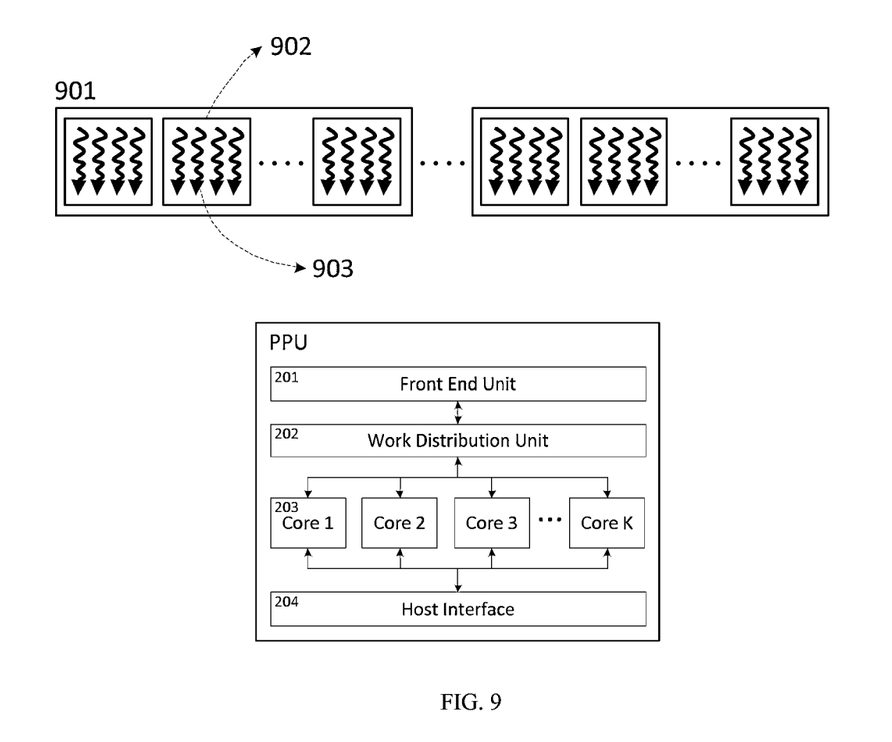
FIG. 9 shows the programming model used for decomposing parallel computations into thread blocks that target the parallel processing unit, according to one embodiment of the present invention.

As it is shown in FIG. 9, kernel functions are hierarchically decomposed 901 at different thread granularities in which threads 903 are grouped into thread blocks 902. In such scheme, each thread block 902 is executed in a different PPU core 203 and threads 903 are allowed to perform accesses to the shared memory 305, the constant memory 306, and the system memory 105. However, thread blocks 902 are only allowed to access the shared memory 305 of the PPU core 203 where they are being executed. Additionally, performance can be further increased by carefully partitioning kernel input data into sublists of thread blocks 902 in such a manner that memory accesses are coalesced.

Parallel Object Detection

The process of object detection consists of determining which regions of a given image are prone to contain a desired object shape (e.g. human faces, handwritten characters or traffic signs among others). Many of the currently available methods (e.g. the Viola-Jones framework) perform this process using a boosted cascade of classifiers that are previously trained for recognizing specific patterns. These patterns characterize the relevant features of the object and may be based on any other existing methods such as SIFT, SURF, Local Binary Patterns (LBP) or simple Haar filters. The arrangement of the classifiers within the cascade is generally determined using the so-called boosting process and may involve the usage of a combination of multiple machine learning techniques. Typically, the boosting process builds a cascade of classifiers from an annotated image database with positive and negative object examples. This technique is also known as supervised learning and, in order to be effective, requires an aligned database with images having the same width and height. For this reason, the output of this specific machine learning process is a boosted cascade of classifiers that only detects objects whose dimensions are greater or equal to the dimensions of the images in the database. Due to the hierarchical nature of the classifier cascade, it is not required to perform filter evaluations for all the features considered in the detection process thus effectively decreasing the computational footprint. Since filter evaluation usually involves determining the area between pixel regions and these areas may overlap, it is common to use a summed area table 401 for avoiding redundant computations.

Figure 4:
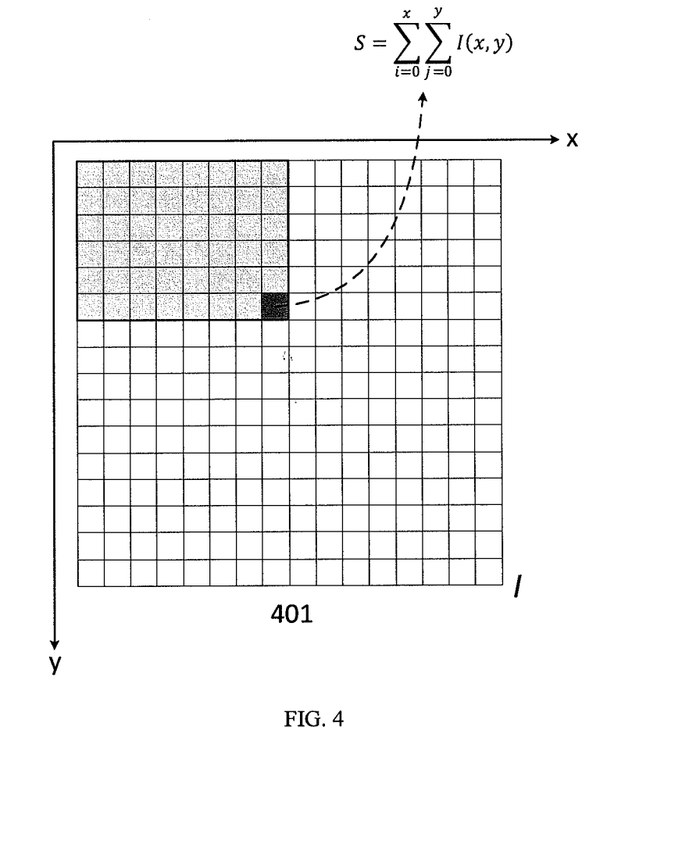
FIG. 4 illustrates the computation phase of the summed area table for a given image, in accordance with one or more aspects of the present invention.

As it is depicted in FIG. 4, a typical implementation of the summed area table 401 method involves the computation of the accumulated sum of all pixel intensity values up to a given pixel according to this expression:

$$S = \sum_{i=0}^{x} \sum_{j=0}^{y} I(x, y)$$

The abovementioned summed area table 401 expression could be executed in one of the CPU cores 101 using a conventional sequential implementation that uses two nested loops. However, this solution does not exploit data-level parallelism thus underutilizing the abundant computational resources of the PPU 102. Therefore, one of the alternatives to increase the object detection throughput would rely on an optimized summed area table 401 method that targets the PPU 102 and fully exploits both coarse-grain and fine-grain parallelism.

Figure 5:
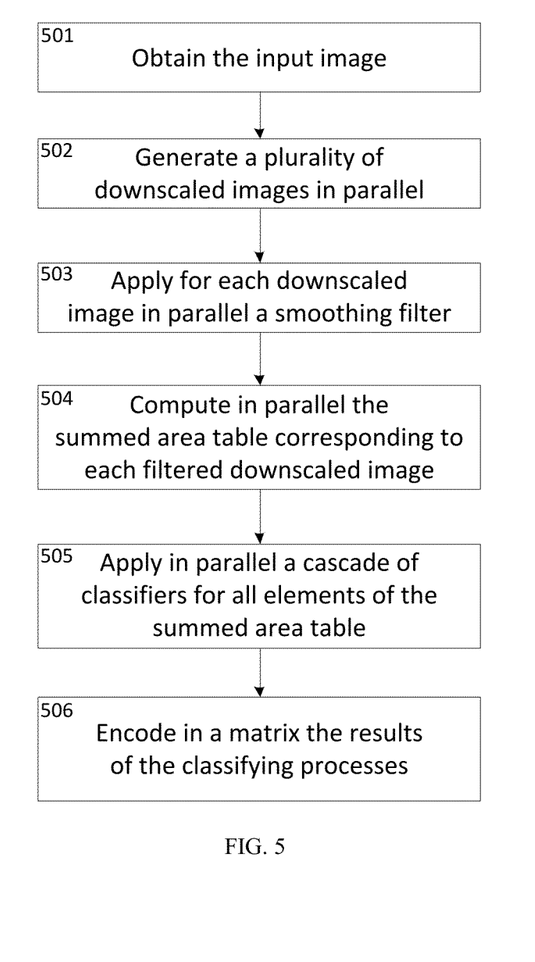
FIG. 5 illustrates the steps involved in the parallel computation of object detection in the computer system depicted in FIG. 1, according to one embodiment of the present invention.

FIG. 5 shows the flowchart of the parallel object detection process. In this embodiment, the detection method may start from an input image or video frame represented as an array of pixels. These image frames are usually retrieved from a single or multiple video streams, which may be originated from digital video cameras or simply organized as video files. In this scenario, the CPU cores 101 parse the input in parallel by assigning one CPU thread to each video stream. The parsing process handled by the CPU threads also involves handling the video decoding, which itself could be performed using a multithreaded codec engine that exploits intra-frame parallelism. The parallel implementation of this engine is not discussed in detail since it is not critical for the present invention. Additionally, the multithreaded video decoder implementation may be deployed in the form of a shared library or in any other layer of the OS. Once the video frame decoding process has been completed in the CPU cores 101, the parallel object detection method starts by fetching a decoded image frame from the CPU thread pool. As it is shown in FIG. 5, one of the steps involves the parallel computation of the summed area table 401 using the PPU 102. This computation is parallelized at the fine-grain level by using prefix sum operations. The prefix sum is a data-parallel primitive applied to a given vector in which each element is generated by computing the sum of the elements up to its index. There are possible variations of this primitive, among them the exclusive prefix sum. Given an input sequence $A=\{a_0, a_1, \ldots, a_{n-1}\}$, the exclusive prefix sum primitive $A_{exc}$ is formally defined as follows:

$$A_{exc} = \{0, a_0, a_0+a_1, a_0+a_1+a_2, \ldots, a_0+a_1+a_2+\ldots+a_{n-2}\}$$

Starting from a given image it is then straightforward to build its corresponding summed area table 401 with the help of the exclusive parallel prefix sum primitive. Let I be a given input n×m image encoded as a matrix:

$$I = \begin{pmatrix} i_{00} & i_{01} & \cdots & i_{0m-1} \\ i_{10} & i_{11} & \cdots & i_{1m-1} \\ \vdots & \vdots & \ddots & \vdots \\ i_{n-10} & i_{n-11} & \cdots & i_{n-1m-1} \end{pmatrix}$$

The $I_S$ summed area table 401 is then computed by applying first the $A_{exc}$ exclusive prefix sum for each row and then for the columns in parallel. Since this method is meant to be executed in the PPU 102, in order to preserve data locality in local private caches, it would be much better to perform row-wise exclusive prefix sums and two matrix transpositions instead of both row-wise and column-wise operations. Given this assumption, $I_{exc}$ represents the row-wise exclusive scan and $I^T$ the transpose of the image matrix that are used for computing in parallel the $I_S$ summed area table 401 as follows:

$$I_{exc} = \begin{pmatrix} 0 & i_{00} & i_{00}+i_{01} & \cdots & (i_{00}+i_{00}+i_{01}+\ldots+i_{0m-2}) \\ 0 & i_{10} & i_{10}+i_{11} & \cdots & (i_{10}+i_{10}+i_{11}+\ldots+i_{1m-2}) \\ \vdots & \vdots & \vdots & \ddots & \vdots \\ 0 & i_{n-10} & i_{n-10}+i_{n-11} & \cdots & (i_{n-10}+i_{n-10}+i_{n-10}+i_{n-11}+\ldots+i_{n-1m-2}) \end{pmatrix}$$

$$I_{exc}^T = \begin{pmatrix} 0 & 0 & \cdots & 0 \\ i_{00} & i_{10} & \cdots & i_{n-10} \\ i_{00}+i_{01} & i_{10}+i_{11} & \cdots & i_{n-10}+i_{n-11} \\ \vdots & \vdots & \ddots & \vdots \\ (i_{00}+\ldots+i_{0m-2}) & (i_{10}+\ldots+i_{1m-2}) & \cdots & (i_{n-10}+\ldots+i_{n-1m-2}) \end{pmatrix}$$

$$I' = I_{exc}^T$$

$$I'_{exc} = \begin{pmatrix} 0 & 0 & 0 & \cdots & 0 \\ 0 & i_{00} & i_{00}+i_{10} & \cdots & (i_{00}+\ldots+i_{n-20}) \\ \vdots & \vdots & \vdots & \ddots & \vdots \\ & & (i_{00}+\ldots+i_{0m-2}) & & (i_{00}+\ldots+i_{0m-2}) \\ 0 & (i_{00}+\ldots+i_{0m-2}) & +\ldots+ & \cdots & +\ldots+ \\ & & (i_{10}+\ldots+i_{1m-2}) & & (i_{n-20}+\ldots+i_{n-2m-2}) \end{pmatrix}$$

$$I_S = I'^T_{exc}$$

$$I_S = \begin{pmatrix} 0 & 0 & \cdots & 0 \\ 0 & i_{00} & \cdots & i_{00}+\ldots+i_{0m-2} \\ \vdots & \vdots & \ddots & \vdots \\ & & & (i_{00}+\ldots+i_{0m-2}) \\ 0 & (i_{00}+\ldots+i_{n-20}) & \cdots & +\ldots+ \\ & & & (i_{n-20}+\ldots+i_{n-2m-2}) \end{pmatrix}$$

The computations described above expose fine-grain parallelism at row-level. Due to this fact, it is then possible to simultaneously launch concurrent parallel prefix sum operations thus maximizing the occupancy of the PPU 102. The difference between serial and concurrent kernel execution is illustrated in FIG. 11.

As it is depicted in the flow diagram of FIG. 5, the parallel detection process starts at step 501 by obtaining the input image from the system memory 105. Since the evaluation of the boosted cascade of classifiers must find objects of different sizes, the input image has also to be downscaled multiple times; one corresponding to each scale considered. Step 502 involves executing in the PPU 102 as many kernel functions in parallel as the number of selected scales. Each kernel function of step 502 is then responsible of linearly resizing the input image using different scaling factors. Additionally, in order to avoid the undesired effect of aliasing, which is intrinsic to any scaling process, the usage of smoothing filtering is also required. In step 503 each one of the parallel image downscaling kernels applies any existing filtering method (e.g. bilinear or bicubic filtering, among others). Steps 502 and 503 may be combined and implemented in the PPU 102 with a kernel function that relies on a divide and conquer approach where each input image is split into equally-sized image chunks of w×h elements. Additionally, for each image chunk a block of w×h threads 903 is created. These image chunks, which respectively correspond to different image subregions, are transferred in parallel from the system memory 105 to the shared memory 305 of the PPU cores 203. If the number of thread blocks 902 is greater than the number of cores available in the PPU 102, the remaining thread blocks 902 are dynamically enqueued and dequeued as the PPU 102 resources of each core become available. At this point, memory consistency among all threads 903 within a block is ensured by executing a barrier instruction in each PPU core 203. Then the scaling computations of each image subregion take place by performing the selected smoothing filtering method with fine-grain parallelism in each thread block 902. In this process, each thread 903 within the block computes the new smoothed value of its corresponding image subregion pixel. Therefore, the number of threads 903 in a given thread block 902 equals the number of pixels of the image chunk stored in its corresponding shared memory 305. Finally, the process concludes by transferring the filtered image subregions from each PPU 102 shared memory 305 to the system memory 105. In another embodiment, the method described in steps 502 and 503 may be fully implemented in hardware using fixed-function logic blocks instead of using kernel functions implemented in software. For instance, state of the art GPUs usually perform image scaling and filtering using hardware texture units.

Step 504 involves the computation of the summed area table 401 using different degrees of parallelism for the downscaled images. This process computes the $I_S$ matrix for each downscaled image in parallel by launching the execution of concurrent kernel functions. Therefore, a given kernel function computes the summed area table 401 for each one the multiple downscaled images generated in steps 502 and 503 thus exploiting coarse-grain parallelism. Additionally, fine-grain parallelism is achieved through the usage of the $A_{exec}$ exclusive prefix sum as it has been previously described. It should be noted that the $A_{exec}$ function is itself parallelized, and all the steps involved in the computation of the summed area table 401 will be further discussed in detail later. The parallel objected detection method continues with the evaluation of the boosted cascade of classifiers taking as an input the summed area tables 401. At step 505 the cascade of classifiers is evaluated through the usage of another kernel function which is also executed in the PPU 102. Multiple instances of this kernel function are launched and executed in parallel for all the summed area tables 401 that have been generated in the previous steps. From a high level perspective, there are two possible parallelization strategies for this evaluation when detecting objects that are larger than those that were used for training the cascade. The first one consists of resizing the cascade filters (i.e. variable-sized sliding window 806) whereas the second relies on rescaling the input image instead of the filters (i.e. fixed-sized sliding window 806). In this embodiment, the size of the sliding window 806 is fixed, and as the flow diagram of FIG. 5 shows, relies on image scaling. Therefore, maximizing the occupancy of the functional units 303 of the PPU cores 203 is the reason for implementing this cascade evaluation technique. As the following equation shows, the number of potential simultaneous threads $T_n$ decreases as the size of the sliding window 806 ($W_w \times W_h$) is increased:

$$T_n = \left\lceil \frac{I_{S_w} \cdot I_{S_h}}{W_w \cdot W_h} \right\rceil$$

Let $I_S$ be a summed area table 401 of dimensions $I_{S_w} \times I_{S_h}$, then the number of threads $T_h$ and thus the potential parallelism will be maximized if the sliding window 806 dimensions ($W_w \times W_h$) are kept constant and small.

Finally, in step 506 the parallel object detection process concludes by encoding the evaluation results in a matrix and storing it in the system memory 105. In such a matrix, each element represents the position of the detected object in the input image. For instance, in one embodiment, a given (x, y) matrix element would encode whether a sliding window 806 having its top left corner at those coordinates contains an object or not. Referring again to step 504, each summed area table 401 computed in the PPU 102 relies on an optimized parallel exclusive prefix sum primitive for maximizing performance. This primitive hierarchically decomposes the input stream into several sublists using a divide and conquer approach at different granularities. The purpose of this parallelization pattern is to closely accommodate input data stream partitions with the underlying programming model used for PPU 102 computations (e.g. OpenCL, CUDA among others).

Figure 6:
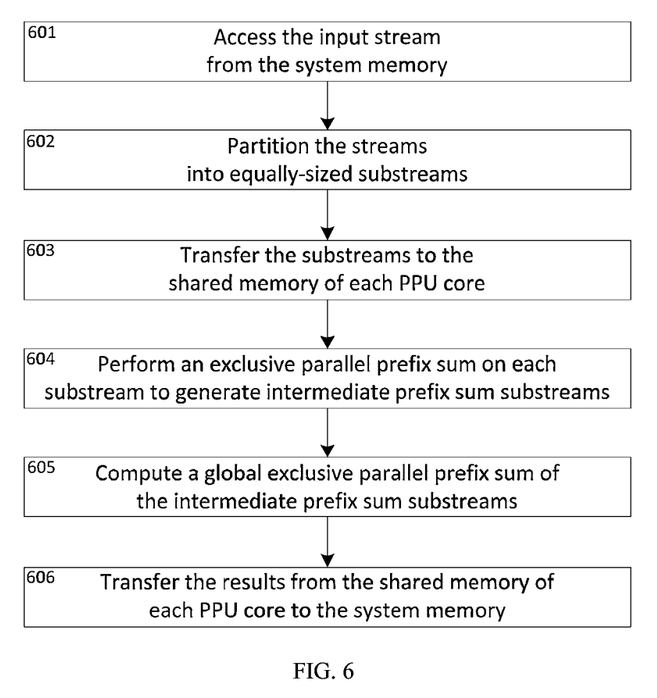
FIG. 6 shows the computation steps required for the computation of the parallel exclusive prefix sum of steps 703 and 706 depicted in FIG. 7, according to one embodiment of the present invention.

As it is shown in the flow diagram of FIG. 6, the parallel exclusive prefix sum primitive computation involves several tasks. The process starts at step 601 by accessing the input data stream from the system memory 105 and continues 602 by partitioning the stream into equally-sized substreams. In an advantageous embodiment, the size of each substream is a multiple of the P-way SIMD engines available in the functional units 303 of the PPU cores 203. Therefore, an optimal-sized substream requires M*P elements where M≥1 and constitutes a thread block 902. This arrangement allows obtaining a work-efficient parallel implementation that only needs to perform the minimum number of additions, thus increasing throughput. Similarly, PPU 102 occupancy is maximized due to the fact that all SIMD lanes of the functional units 303 are kept busy. Hence, all additions are hierarchically structured using the multithreaded programming model depicted in FIG. 9. In order to maximize memory bandwidth, each substream obtained from the M*P partition is transferred at step 603 from the system memory to the shared memories 305 available in each PPU core 203. These memory transfers are performed in parallel by grouping the substream elements into data chunks and subsequently storing each one of them into different shared memories 305. Moreover, thread synchronization through barrier instructions is required for ensuring that all transfers to the shared memories 305 have been completed before starting SIMD additions.

At the lowest level, this thread organization computes the exclusive parallel prefix sum for a given substream of P elements by using $\log_2 P$ SIMD instructions, which themselves perform P additions in parallel. These computations are performed independently for each one of the substreams at step 604 by using different thread blocks 902. Thus when this step concludes, each thread block 902 will have computed an intermediate prefix sum of the substream elements stored in the core's shared memory 305, where the abovementioned thread block 902 was executed. In order to obtain the complete exclusive parallel prefix sum of the input stream, it is required to perform further additions with the intermediate results obtained at step 604. These additions are conducted at step 605 where each thread block 902 computes again the remaining sums. Once these parallel additions have concluded, the exclusive parallel prefix sum of the input stream will be fully completed. The final step 606 of the flow diagram depicted in FIG. 6, performs the memory transfers of these stream elements from the shared memory 305 of each PPU core 203 and subsequently stores them into the system memory 105.

Figure 7:
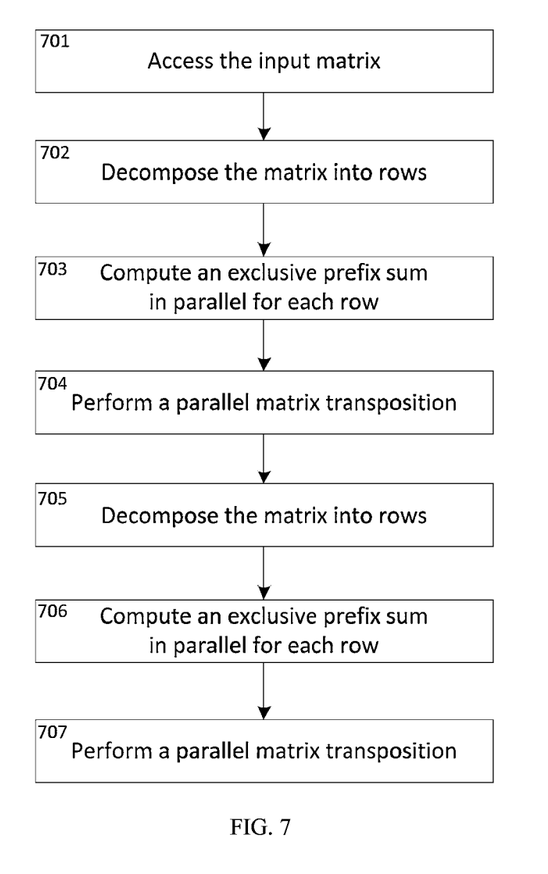
FIG. 7 illustrates the computation steps required for the parallel computation of the summed area table, according to one embodiment of the present invention.

Referring again to step 504, the parallel computation of the summed area table in the PPU 102 is obtained as a result of a combination of a series of exclusive parallel prefix sum operations and matrix transpositions. These steps, depicted in FIG. 7, exploit coarse-grain parallelism by concurrently executing the same kernel functions for each downscaled image generated at step 503, in accordance with one embodiment of the present invention. At step 701 the summed area table computation starts by accessing the I input matrix values from the system memory 105. The process continues 702 by decomposing the I matrix into rows with the purpose of exploiting fine-grain parallelism at row-level. At step 703 an exclusive parallel prefix sum kernel is computed for each one of the abovementioned rows, thus producing the $I_{exc}$ matrix. The purpose of this parallelization scheme is to further increase the occupancy of the cores of the PPU 102. Step 704 conducts a parallel transposition of $I_{exc}$ in order to generate the $I_{exc}^T$ matrix. In one embodiment, the method used for performing the parallel matrix transposition may be based on any of the existing techniques that were designed for distributed memory architectures. For instance, the parallelization strategy followed for the transposition could involve the decomposition of the matrix into equally sized tiles. Then each tile might be copied in parallel into the shared memory 305 of each PPU core 203. Finally, the rows and columns could be exchanged in place from the shared memory 305 in order to maximize bandwidth. At step 705 the $I_{exc}^T$ matrix is decomposed into rows as it was previously done 702. Then the exclusive parallel prefix sums are computed for each row at step 706 using the same techniques conducted at step 703. As a result of this step, the $I'_{exc}$ matrix is generated. At step 707 a final parallel transposition of the $I'_{exc}$ matrix is performed conducting the same strategy followed at step 704. The desired summed area table $I_S$ is thus finally obtained at the end of the computations of step 707.

Figure 8:
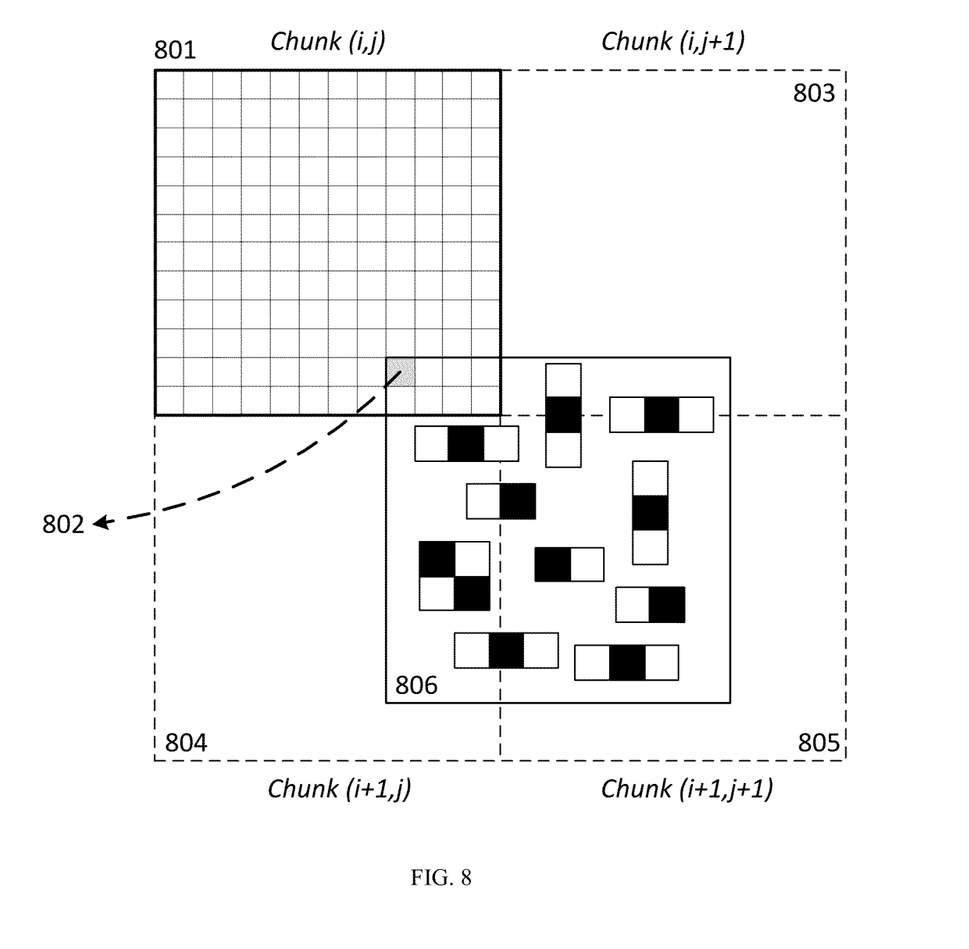
FIG. 8 depicts the system memory chunks transferred to the shared memory of a given core of the parallel processing unit, according to one embodiment of the present invention.
Figure 10:
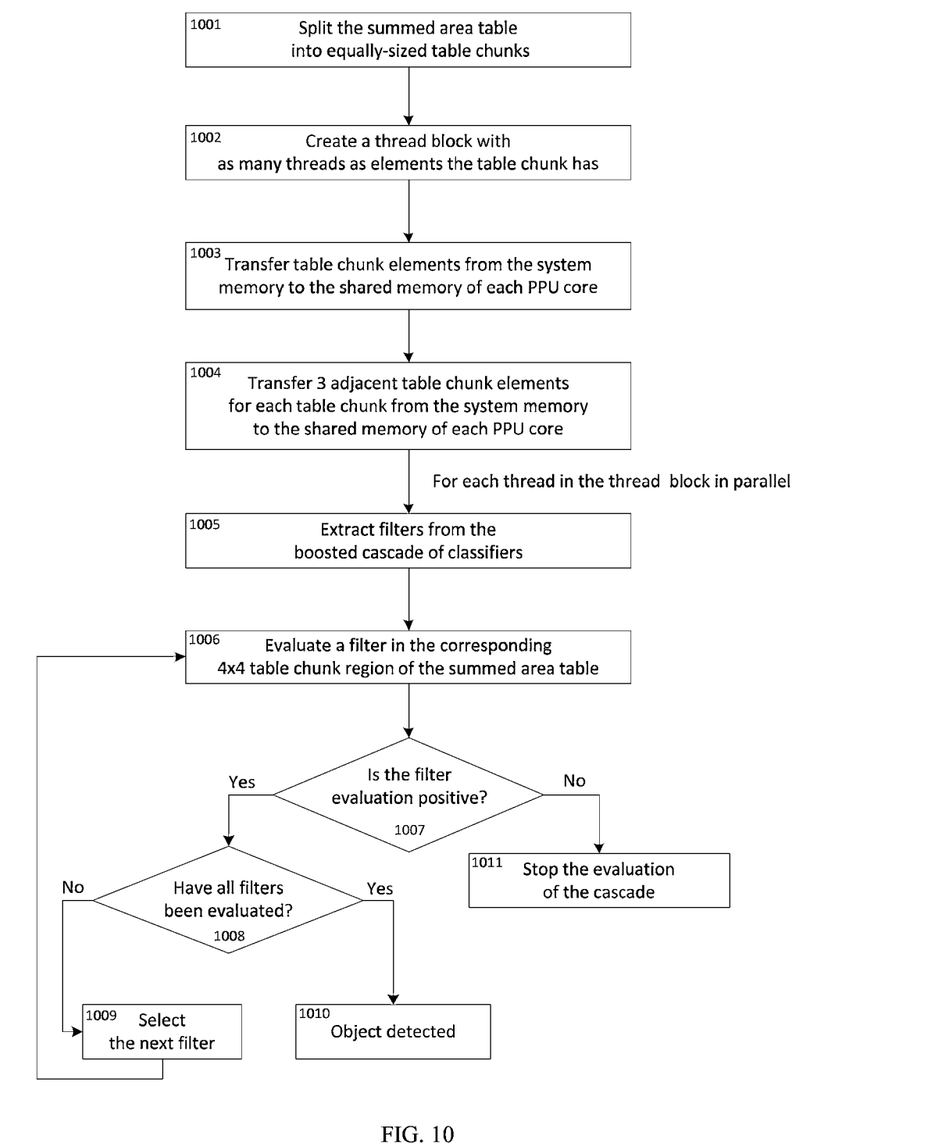
FIG. 10 depicts the flowchart with all the steps required for the parallel evaluation of the boosted cascade of classifiers, according to one embodiment of the present invention.

Referring again to FIG. 5, once summed area tables for each downscaled image have been computed 504, the parallel evaluation of the boosted cascade of classifiers is performed at step 505. In order to fully maximize the occupancy of PPU cores 203, all the computations are implemented in a single kernel, which is concurrently launched and executed for each downscaled image. All the steps conducted in step 505 are illustrated in the flowchart of FIG. 10. At step 1001, a given summed area table 401 obtained as a result of the abovementioned steps, is split into equally-sized table chunks. The size of these table chunks is experimentally determined in such a manner that maximizes the $T_n$ thread count. In this embodiment, for each equally-sized table chunk a thread block 902 is created. The number of threads 903 in a thread block 902 corresponds to the total number of elements included in a given table chunk. These threads 903 are initialized and created at step 1002 using the programming model specifications illustrated in FIG. 4. Thereafter, elements from a given table chunk are transferred at step 1003 from the system memory 105 to the shared memory 305 of each PPU core 203 using a 4×4 grid pattern. As shown in FIG. 8, in this embodiment all memory transfers required for storing the 4×4 grid are performed by executing a single thread block 902, where each thread 903 transfers a collection of elements. Starting from a given summed are table 401 chunk (i,j) 801, not only it is required to transfer to the shared memory 305 all elements of chunk (i,j) 801, but also elements from the immediately adjacent chunks: chunk (i,j+1) 803, chunk (i+1,j) 804, and chunk (i+1,j+1) 805. Since each chunk (i,j) 801 is meant to be processed by a different PPU core 203, the sliding window 806 starting at a given element 802 from chunk (i,j) 801 may require elements from adjacent elements too. This is due to the fact that both the sliding window 806 and the chunk (i,j) 801 must have the same dimensions. Referring again to FIG. 10, the chunk (i,j+1) 803, chunk (i+1,j) 804, and chunk (i+1, j+1) 805 are transferred from the system memory 105 to the shared memory 305 of each PPU core 203 at step 1004. Additionally, in one particular embodiment, a barrier instruction may be required after the completion of steps 1003 and 1004 for ensuring that all threads 903 in a thread block 902 have completed the required memory transfers.

The fine-grain parallel object detection process starts by extracting filters from the boosted cascade of classifiers at step 1005. In this embodiment, the filters are assumed to be stored in the constant memory 306 of each PPU core 203 before the process starts. These filters have been computed from a selection of visual descriptors. The visual descriptors may be extracted from images using feature extraction methods such as SIFT, SURF, LBP or Haar among others. Initially the features are retrieved from the constant memory 306 in parallel by each thread 903 from a thread block 902 processing a given chunk (i,j) 801. Multiple summed area table 401 chunks are subsequently scanned in parallel taking into account the three adjacent chunks, thus each thread block 902 considers its corresponding 4×4 table chunk as the area of interest. At step 1006 each thread 903 from a thread block 902 processing a given chunk (i,j) 801, starts evaluating all filters stored in the constant memory 306 iteratively. As FIG. 10 depicts, this subprocess is implemented in the form of a parallel loop where each thread 903 independently evaluates all filters for a given sliding window 806. Moreover, each filter must not be evaluated more than once by a given thread 903. All operations required for a single filter evaluation are conducted at step 1006.

The amount and type of operations greatly varies depending on the visual descriptors and the technique used for extracting them. Typically, the result of a filter evaluation 1006 is a numeric value that must be compared against a preassigned threshold, which is also stored in the constant memory 306. In one embodiment, the filter evaluation 1006 is considered positive 1007 if the obtained numeric value does not violate the abovementioned threshold. For instance, the threshold violation check may be implemented in a particular embodiment using a conditional instruction (e.g. A>B). In case of a threshold violation, the thread 903 in charge of a given sliding window 806 triggers an early exit of the loop at step 1011. This technique frees PPU core 203 resources, which may be used for issuing and executing instructions from other threads 903. If the threshold is not violated, at step 1008 the thread 903 checks if all filters stored in the constant memory 306 have been evaluated. If there are filters that still remain unevaluated, the loop continues at step 1009 by selecting one of the remaining filters from the constant memory 306. Otherwise, the loop concludes at step 1010 and determines the presence of an object in the sliding window 806 evaluated by the abovementioned thread 903.

It should be noted that all the steps that constitute the flowchart depicted in FIG. 10 are implemented in a single kernel function. Since this kernel function is concurrently executed for a collection of summed area tables 401 corresponding to different image scales, the output of the kernel is the parallel detection of objects at different sizes. Additionally, due to the fact that fine-grain parallelism is exploited within a kernel and coarse-grain parallelism by concurrently executing the kernel for different scales, PPU 102 underutilization is avoided.

What is claimed is:

1. A method for detecting variable sized objects in an image using a computer system with an array of cores configured to concurrently execute a plurality of threads, wherein each core comprises a shared memory, a constant memory and a plurality of functional units, the method comprising the following steps:

calculating in parallel a summed area table from an image, by executing a plurality of exclusive parallel prefix sum kernel functions to increase utilization of the cores and increase calculating speed, followed by executing at least two parallel transposition kernel functions, decomposing the summed area table into a plurality of table chunks, creating a thread per element of the table chunk and storing each table chunk in the shared memory of a core, evaluating a plurality of classifiers for a plurality of table chunks by executing a cascade evaluation kernel function to speed evaluations of classifiers using the summed area table to determine whether an object is enclosed within the table chunk, wherein each kernel function is assigned to a plurality of block threads, a block thread being executed in a single core and having access to the shared memory of the core, each thread of the thread block comprising Single Instruction Multiple Data (SIMD) instructions to be processed in a plurality of functional units of the core.

2. The method of claim 1, wherein the image for calculating the summed area table is a downscaled image selectable from a plurality of downscaled images obtained by executing a resizing kernel function and by applying a plurality of scale factors to an input image.

3. The method of claim 2, wherein the image is filtered by applying a smoothing filter.

4. The method of claim 2, wherein calculating the summed area table is performed concurrently for a plurality of downscaled images of an image and further comprises for each downscaled image:

encoding a given downscaled image in a matrix comprising rows and columns, executing the exclusive prefix sum kernel function by concurrently calculating, for each row element of the matrix, an exclusive prefix sum comprising an accumulated sum of row elements to form an intermediate matrix, executing the transposition kernel function by swapping rows and columns of the intermediate matrix to form a transposed matrix, executing the exclusive prefix sum kernel function by concurrently calculating, for each row element of the transposed matrix, an exclusive prefix sum comprising an accumulated sum of row elements to form a second intermediate matrix; and executing the transposition kernel function by swapping rows and columns of the second intermediate matrix to form a summed area table for the downscaled image.

5. The method of claim 4, wherein the plurality of summed area tables corresponding to the plurality of downscaled images are decomposed into equally sized table chunks, the size being selected in dependence upon the size of the object to be detected.

6. The method of claim 1, wherein the plurality of classifiers are arranged in a cascade and sequentially evaluated.

7. The method of claim 6, wherein the plurality of classifiers are stored in the constant memory of each core.

8. The method of claim 1, wherein three adjacent table chunks of a given summed area table chunk are transferred to the shared memory of the core in which the given table chunk is processed.

9. The method of claim 1, wherein the number of elements of the table chunk is a multiple of the number of functional units of a core.

10. A method according to claim 1, comprising downscaling the input image instead of the filters to obtain a fixed-sized sliding window and maximizing occupancy of the functional units and increasing the number of simultaneous threads.

11. A method according to claim 1, further comprising applying a smoothing filter to each image chunk by creating a thread block, wherein the image chunk and the thread block have the same number of elements and wherein each filtered pixel of the image chunk is computed by a thread in the thread block.

* * * * *